(12) United States Patent
Matsui

(10) Patent No.: US 6,292,817 B1
(45) Date of Patent: Sep. 18, 2001

(54) DISCRETE COSINE TRANSFORMATION CIRCUIT

(75) Inventor: Masaru Matsui, Gifu (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/239,192

(22) Filed: Jan. 28, 1999

(30) Foreign Application Priority Data

Jan. 30, 1998 (JP) .................................................. 10-019269

(51) Int. Cl.[7] .................................................... G06F 17/14
(52) U.S. Cl. ............................................................. 708/402
(58) Field of Search ............................................ 708/402

(56) References Cited

U.S. PATENT DOCUMENTS

| | | | |
|---|---|---|---|
| 4,748,579 | 5/1988 | Zibman | 708/405 |
| 4,945,506 | 7/1990 | Baji et al. | 708/520 |
| 5,117,381 | * 5/1992 | Osaka et al. | 708/402 |
| 5,471,412 | * 11/1995 | Shyu | 708/402 |
| 5,477,469 | * 12/1995 | Motomura | 708/402 |
| 5,831,881 | * 11/1998 | Fiedrich et al. | 708/402 |
| 5,835,391 | 11/1998 | Cho | 708/401 |
| 6,185,595 | 2/2001 | Hori et al. | 708/402 |
| 6,189,021 | 2/2001 | Shyu | 708/401 |
| 6,209,015 | 3/2001 | Jhung | 708/402 |

* cited by examiner

Primary Examiner—David H. Malzahn
(74) Attorney, Agent, or Firm—Cantor Colburn LLP

(57) ABSTRACT

To achieve bi-directional transformation by using a single simply-structured discrete cosine transformation circuit for use in an audio recording/reproducing device. There is provided a circuit which comprises a RAM 60, a ROM 68, a multiplier 66, and an adder/subtracter 80 and is capable of performing inverted transformation of a discrete cosine transformation. The multiplier 66 multiplies operand data stored in the RAM 60 by a proportional coefficient stored in the ROM 68. The adder/subtracter 80 add/subtracts outputs of the multiplier 66. This circuit is also able to perform a characteristic operation in a forward direction, such as addition or subtraction using intact base data. Specifically, data before conversion is stored in the RAM 61, and one of them is supplied to the adder/subtracter 80 via an input terminal A. The supplied base data is added to the value "0" which is supplied to the adder/subtracter 80 via the input terminal B by the selector 88, whereby the base data is passed intact through the adder/subtracter 80. The outputted base data is then fed to the adder/subtracter 80 via the input terminal B by means of loop back through the selector 88, and added or subtracted with respect to another base data item which is supplied to the adder/subtracter 80 via the input terminal A.

4 Claims, 3 Drawing Sheets

DISCRETE COSINE TRANSFORMATION CIRCUIT

BACKGROUND OF THE INVENTION

1. Field of the Invention

The present invention relates to a discrete cosine transform circuit which can be used in compression/extension processing of digital voice data in a digital voice recording and reproduction devices.

2. Description of the Related Art

FIG. 1 is a block diagram showing a processing device which performs encoding/decoding of digitized voice data. At the time of recording, the entered voice signal is first converted to digital voice data by A/D (analog to digital) converter 2. The digital voice data is divided to three, low, medium, and high, frequency bandwidths using QMF (quadrature mirror filter) circuit 4. The digital time series voice data is converted to frequency component data using DCT (discrete cosine transform) circuit 6, and further quantized by a quantizing unit 8. The generated or encoded data is supplied to the next-stage processing circuit, and recorded in a predetermined recording medium.

At the time of reproduction, processing reverse to the processing described above is performed. Specifically, an inverse quantizing unit 10, IDCT (inverse discrete cosine transform) circuit 12, IQMF (inverse quadrature mirror filter) circuit 14 and D/A (digital to analog) converter 16 perform the conversion reverse to the conversion performed by the quantizing unit 8, DCT circuit 6, QMF circuit 4 and A/D converter 2. Specifically, a voice signal is reproduced from the recorded encoded data.

Additionally, DCT is useful for encoding/decoding voice signals, and is widely used. There are various types of DCT. For example, there is one type of DCT foruse in a voice recording/reproducing device which is represented by the following relational equation of 2M items of time series voice data y(n) represented by a time index n which is a continuous integer and M items of frequency component data X(k) represented by a wave number index k which is a continuous integer:

$$y(n) = \sum_{k=0}^{M-1} X(k)\cos\left(\frac{\pi(2k+1)(2n+M+1)}{4M}\right) \quad (0 \leq n < 2M) \tag{1}$$

The DCT is slightly modified from a basic DCT and is therefor termed a Modified DCT, and will hereinafter be abbreviated as MDCT. Moreover, the inverse modified DCT is hereinafter abbreviated as IMDCT.

As an algorithm for processing DCT at a high rate, a method is known in which FFT (fast Fourier transform) is used. By the algorithm using FFT, sequence y(n) is obtained from sequence X(k) in the MDCT. Conversely, sequence X(k) is obtained from sequence y(n) in IMDCT.

More specifically, the relational equation (1) of the time series voice data y(n) and the frequency component data X(k) is represented in a format suitable for the calculation of IMDCT. For MDCT, calculation is performed based on equation (6) below.

The calculation algorithm regarding IMDCT based on the equation (1) will be described hereinafter. First, the data before conversion, i.e., sequence X(k) is re-arranged and re-constructed according to the predetermined rule to define a new sequence U(k). Based on U(k), Z(j) represented in the following equation is defined. Additionally, in the equation, i denotes an imaginary number unit, and $\psi(j)$ denotes the predetermined function of j.

$$z(j) = (U(2j) + iU(2j+1)) \cdot \exp(i\psi(j)) \tag{2}$$

Furthermore, z(n) defined by the following equation is obtained from z(j).

$$z(n) = \sum_j Z(j)\exp(i\Psi'(j)) \tag{3}$$

In order to calculate the equation (3) at high speed, FFT is used. As is well known, FFT calculates the above equation (3) by repeating the arithmetic operation represented by the following equation. Additionally, $\psi'(j)$ is the predetermined function of j.

$$z(j_1) + Z(j_2) \cdot \exp(i\psi'(j)) \tag{4}$$

In IMDCT, u(n) defined in the following equation (5) is obtained from the z(n), and the sequence u(n) is re-arranged and re-constructed to obtain the time series voice data y(n). Additionally, $a_0$ to $a_3$ are proportional coefficients defined for every n.

$$u(n) = a_0 \cdot Rez(n) + a_1 \cdot Rez(M/2-1-n) + a_2 \cdot Imz(n) + a_3 \cdot Imz(M/2-1-n)$$

$$u(M-1-n) = a_2 \cdot Rez(n) - a_3 \cdot Rez(M/2-1-n) - a_0 \cdot Imz(n) + a_1 \cdot Imz(M/2-1-n) \tag{5}$$

On the other hand, for MDCT, the following relational equation is used to obtain the frequency component data X(K) from the sequence x(n) based on the time series voice data y(n).

$$X(k) = \frac{2}{M}\sum_{k=0}^{M-1} x_1(n)\cos\left(\frac{\pi(2k+1)(2n+M+1)}{4M}\right) \tag{6}$$

The equations (1) and (6) have substantially the same format except the coefficient 2/M. Therefore, the calculation algorithm of MDCT is expected to be similar to that of the IMDCT described above. In practice, the calculation algorithm of MDCT based on the equation (6) is as follows, and has points common with the IMDCT algorithm, though some points differ.

First, a new sequence x'(n) is defined by the sum (or difference) of the predetermined elements of the data before conversion, i.e., the sequence x(n) as shown in the following equation:

$$x'(n) = x(n_1) + x(n_2) \text{ or } x(n_1) - x(n_2) \tag{7}$$

This process is not included in IMDCT. Based on the x'(n), z(j) is defined in the following equation having the same format as that of the equation (2):

$$z(j) = (x'(2j) + ix'(2j+1)) \cdot \exp(i\psi(j)) \tag{8}$$

Furthermore, Z(k) is obtained from the z(j) as defined in the following equation:

$$Z(k) = \sum_j z(j)\exp(i\psi'(j)) \tag{9}$$

The equation (9) has the same format as that of the equation (3), FFT is also used in the high speed calculation in the same manner as in the equation (3), and the arithmetic operation is performed in the following format:

$$z(j_1)+z(j_2)\cdot\exp(i\psi'(j)) \quad (10)$$

In MDCT, the frequency component data X(k) is obtained from the Z(k) by the following equation (11):

$$X(k)=b_0\cdot ReZ(k)+b_1\cdot ReZ(M/2-1-k)+b_2\cdot ImZ(k)+b_3\cdot ImZ(M/2-1-k)$$

$$X(M-1-k)=b_2\cdot ReZ(k)-b_3\cdot ReZ(M/2-1-k)-b_0\cdot ImZ(k)+b_1\cdot ImZ(M/2-1-k) \quad (11)$$

In the equation, $b_0$ to $b_3$ are proportional coefficients determined for each k. When the proportional coefficient $a_L$(L=0 to 3) determined for each n is represented as $a_L=a_L(n)$ or the proportional coefficient $b_L$(L=0 to 3) is represented as $b_L=b_L(k)$, the following relationship is established between the coefficients:

$$b_L(j)=a_L(j)\times 2/M \quad (12)$$

FIG. 2 is a block diagram showing a conventional IMDCT circuit in which the aforementioned IMDCT arithmetic operation is realized. The data before conversion, i.e., the frequency component data X(k), is stored in RAM (random access memory) 20. The RAM 20 is also constituted to store the results during the course of the arithmetic operation. For example, the proportional coefficient $a_L$ (L=0 to 3) is stored in ROM (read only memory) 22. The value read from RAM 20 and held in a register 26 and the value read from ROM 22 and held in a register 28 are transmitted to a multiplier 24, which multiplies these values to transmit them to either register 30 or 32.

An adder/subtracter 34 has two inputs A, B, which are connected to selectors 36, 38. The registers 26 and 30 are connected to the input side of the selector 36. Therefore, the selector 36 can selectively supply the data stored in RAM 20 or the data multiplied by the multiplier 24 to one input terminal A of the adder/subtracter 34. On the other hand, registers 42, 44 are connected to the selector 38 via a selector 40, while the register 32 is connected to the input side of the selector 38. Therefore, the selector 38 can selectively supply the value stored in the register 32 (e.g., the value obtained by multiplying the data stored in RAM 20 by the multiplier 24) or the output result of the adder/subtracter 34 to the other input terminal B of the adder/subtracter 34. The output of the adder/subtracter 34 can be returned and written to RAM 20 via the register 42.

In the conversion of the time series voice data y(n) and the frequency component data X(k), for the time series voice data y(n), consecutive 2M items of data are regarded as one block, and the data is handled block by block. One generated block of time series voice data is stored in RAM 44. In order to minimize the distortion of voice at boundaries of the blocks, the range of the block is determined in such a manner that the end of the preceding block and the top of the following block are overlapped with each other. In the overlapped area, the data values of these blocks are added to generate the final voice data y(n). To overlap the data, the voice data stored in RAM 44 can be returned to the adder/subtracter 34. Specifically, the value read from RAM 44 is transmitted to a selector 46 placed between the multiplier 24 and the register 32. The selector 46 selects the output of the multiplier 24 or the output of RAM 44 to transmit the selected value to the adder/subtracter 34 via the selector 38.

The aforementioned arithmetic operation in the conventional circuit will next be described. First, by developing the right side of the equation (2), Z(j) is represented in the following equation:

$$Z(j)=(U(2j)\cdot\cos\psi(j)-U(2j+1)\cdot\sin\psi(j))+i(U(2j+1)\cdot\cos\psi(j)-U(2j)\cdot\sin\psi(j)) \quad (13)$$

Therefore, when the data U(k) is stored in RAM 20, and $\sin\psi(j)$, $\cos\psi(j)$ are stored in ROM 22, the real-number and imaginary-number portions of Z(j) are calculated by successively using the multiplier 24 and the adder/subtracter 34. The operation results of the real-number and imaginary-number portions outputted from the adder/subtracter 34 are stored in RAM 20.

As described above, z (n) is obtained by repeating the arithmetic operation shown in the equation (4). When Z(j) stored in RAM 20 is transmitted to the adder/subtracter 34 via the register 26 and the selector 36 without passing through the multiplier 24, the first term on the right side of the equation (4) is supplied to one terminal A of the adder/subtracter 34. Moreover, the second term on the right side is generated by reading Z(j) stored in RAM 20 and exp(i$\psi'$(j)) stored in ROM 22 and multiplying them in the multiplier 24. The multiplied value is supplied to the other terminal B of the adder/subtracter 34 via the selector 46, the register 32 and the selector 38. The adder/subtracter 34 adds the first and second terms of the equation (4), and the result is stored in RAM 20. The calculation of z(n) is also a complex arithmetic operation, and the real-number portion and the imaginary-number portion are separately calculated in the circuit.

By the arithmetic operation described above, Rez(n), Rez(M/2−1−n), Imz(n), Imz(M/2−1−n) for use in the arithmetic operation of the equation (5) are stored in RAM 20. Moreover, the proportional coefficient aL (L=0 to 3) is stored in ROM 22. The calculation of the equation (5) is performed by sequentially calculating the terms from the first term on the right side by the multiplier 24 and cumulatively adding/subtracting the values by the adder/subtracter 34.

The calculation will be described in more detail. For example, Rez(n) is read from RAM 20 and stored in the register 26. On the other hand, $a_0$ is read from ROM 22 and stored in the register 28. These values are multiplied in the multiplier 24 and stored in the register 32. Subsequently, Rez(M/2−1−n) is read from RAM 20 and stored in the register 26, while $a_1$ is read from ROM 22 and stored in the register 28. It is herein noted that the content of the register 26 is overwritten and changed from Rez(n) stored for the calculation of the first term to Rez(M/2−1−n) for use in the calculation of the second term. The Rez(M/2−1−n) and a, are multiplied in the multiplier 24 and stored in the register 30. The adder/subtracter 34 calculates "A+B" in accordance with the contents of the registers 32 and 30 and transmits the result to the register 44.

Subsequently, the third term is calculated in the same manner as the first and second terms, and stored in the register 30. The adder/subtracter 34 calculates "A+B" in accordance with the content of the register 30 and the cumulative added value up to the second term supplied from the register 44, and transmits an output to the register 44. The fourth term is calculated in the same manner, and added to the added value up to the third term, then the result is returned to RAM 20. Thereafter, the second equation of the equation (5) is calculated in the same manner as the first equation. In the calculation of the second equation, the second term transmitted to the input terminal A corresponds to the subtraction from the first term supplied to the input terminal B, and the adder/subtracter 34 performs "B−A".

As described above, there are many common aspects between arithmetic operations for IMDCT and MDCT. For example, relational equations (8), (9), (11) for MDCT have the same format as relational equations (2), (3), (5) for INDT. However, the MDCT arithmetic operation initially includes a process for relational equation (7). Also, although relational equations (5) and (11) have the same format, they use different coefficients, i.e., $a_L$ and $b_L$ (L=0~3). These are the differences between the arithmetic operations for IMDCT and MDCT.

Therefore, it is impossible for a conventional IMDCT circuit to perform the above arithmetic operation for MDCT when data before MDCT conversion is simply stored in the RAM 20 and the RAM 44 thereof. For example, although relational equation (7) means that addition/subtraction is carried out using operand data intact, i.e., without multiplication, in a conventional IMDCT circuit, non-multiplied data can be supplied to the adder/subtracter 34 only via one of the inputs thereof from the RAM 20 and 44. Therefore, the conventional IMDCT circuit cannot calculate relational equation (7), and thus the arithmetic operation for MDCT. In order to solve this problem, the adder/subtracter 34 must have a structure capable of receiving non-multiplied data via both inputs thereof at one time. Such a circuit inevitably has a complicated structure when constructed by using only the related art.

Moreover, it may be possible to calculate relational equation (11) when a proportional coefficient $b_L$ (L=0~3) is stored in the ROM 22 as well as proportional coefficient $a_L$. However, in that case, proportional coefficients must be read from different addresses in the ROM 22 when calculating relational equations (5) and (11). This results in complicating the structure of an address generation circuit.

In view of the above, conventionally, there is a problem that the entire circuit has a large circuitry size because IMDCT and MDCT circuits are structured as separate circuits. When they are structured as a single circuit, the resultant circuit has a complicated structure.

SUMMARY OF THE INVENTION

The present invention has been conceived to overcome the above problems and aims to provide a discrete cosine transformation circuit capable of bi-directional transformation for MDCT and IMDCT but having a simple structure.

According to the present invention, there is provided a discrete cosine transformation circuit for use in a digital audio recording/reproducing device, for carrying out discrete cosine transformation from time series audio data to frequency component data and inverted discrete cosine transformation from frequency component data to time series audio data. This circuit comprises a first memory for storing the frequency component data which is data before conversion at beginning of reproduction;

a coefficient supplier for supplying a proportional coefficient for multiplication with the data read from the first memory;

a multiplier connected to the first memory and the coefficient supplier;

an adder/subtracter having first input terminal and second input terminal, connected to an output of the multiplier;

a second memory connected on the output side to the first input terminal of the adder/subtracter, for storing the time series audio data which is data before conversion at beginning of recording;

an addition-subtraction result register for storing an output from the adder/subtracter; and an addition-subtraction result selector connected on the output side to the second input terminal of the adder/subtracter, for outputting either contents of the addition-subtraction result register or a value "0". In this circuit, the frequency component data is transformed to the time series audio data for reproduction, the addition-subtraction result selector outputs the value "0" when data read from the second memory is supplied intact to the second input terminal of the adder/subtracter so that an output from the multiplier is stored intact in the addition-subtraction result register, and the time series audio data is transformed to the frequency component data for recording.

According to the present invention, time series audio data, which is non-multiplied data, is supplied from the second memory to the adder-subtracater via the first input terminal. This value is added or subtracted with respect to the value "0" which was also supplied to the adder/subtracter via the second input terminal thereof from the addition-subtraction result selector provided on the output side of the adder/subtracter, so that the value can be passed intact through the adder/subtracter, and then fed back through the adder/subtracter result selector to the adder/subtracter via the second input terminal. This arrangement enables addition or subtraction at the initial stage in a discrete cosine transformation, using the non-multiplication data read from the second memory and supplied to the adder/subtracter via the first input terminal thereof and another non-multiplication data fed back to the adder/subtracter via the second terminal. Subsequent calculation processes will be made based on the calculations common to an inverted discrete cosine transformation.

Further, (claim 2) in such a discrete cosine transformation circuit, the coefficient supplier includes a proportional coefficient memory for storing the proportional coefficient for application in either one of the discrete cosine transformation and the inverted discrete cosine transformation, and a bit shifter for multiplying, when carrying out a transformation other than the one carried out above, the proportional coefficient read from the proportional coefficient memory by two raised to a predetermined power to output to the multiplier.

According to the present invention, proportional coefficients $a_L$ and $b_L$ (L=0~3), which are used to calculate relational equation (11) for a discrete cosine transformation and for relational equation (5) for an inverted discrete cosine transformation, respectively, hold the relationship represented by relational equation (12). Because of this, the proportional coefficient memory stores either one of the proportional coefficients $a_L$, $b_L$ (L=0~3) and the conversion of the equation (12) is applied, if necessary, by using a bit shift circuit. Here, since M in the equation (12) is two raised to predetermined power, the bit shift circuit multiplies one of the proportional coefficients by two raised to predetermined power so as to output another proportional coefficient.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENT

The embodiment of the present invention will next be described with reference to the attached drawings.

Figure 1:
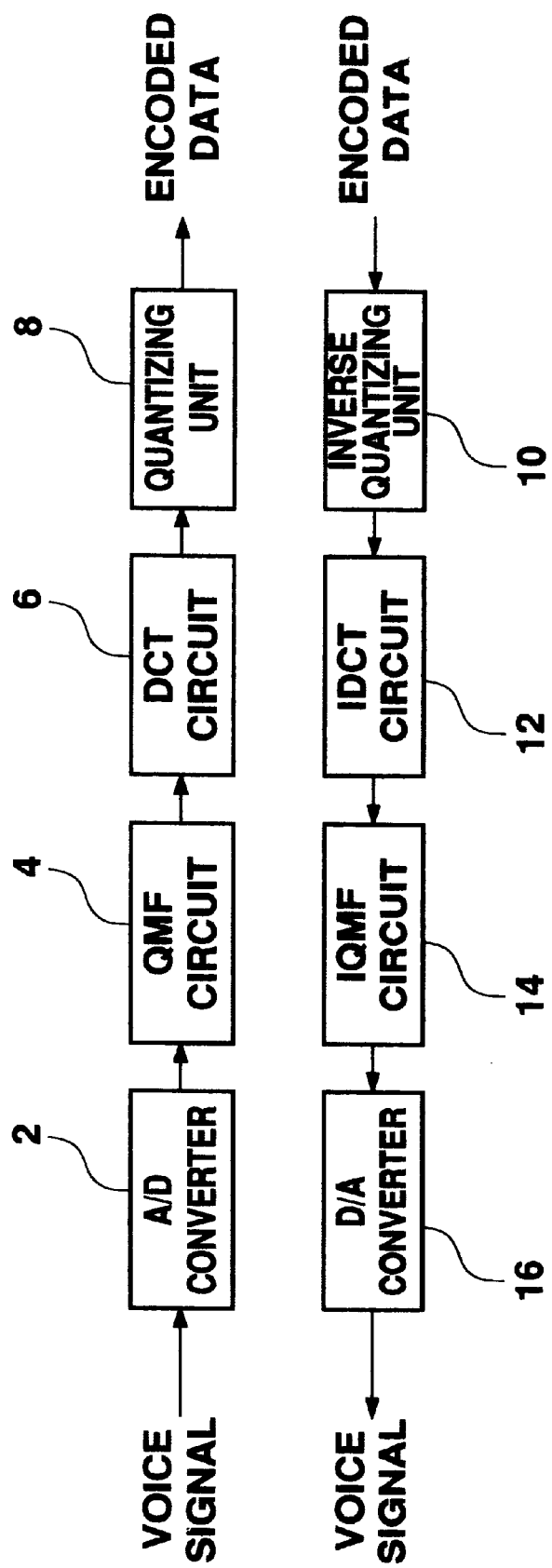
FIG. 1 is a schematic block diagram showing sections for encoding/decoding processing of audio data in an audio recording/reproducing device employing DCT, such as an MD system.
Figure 2:
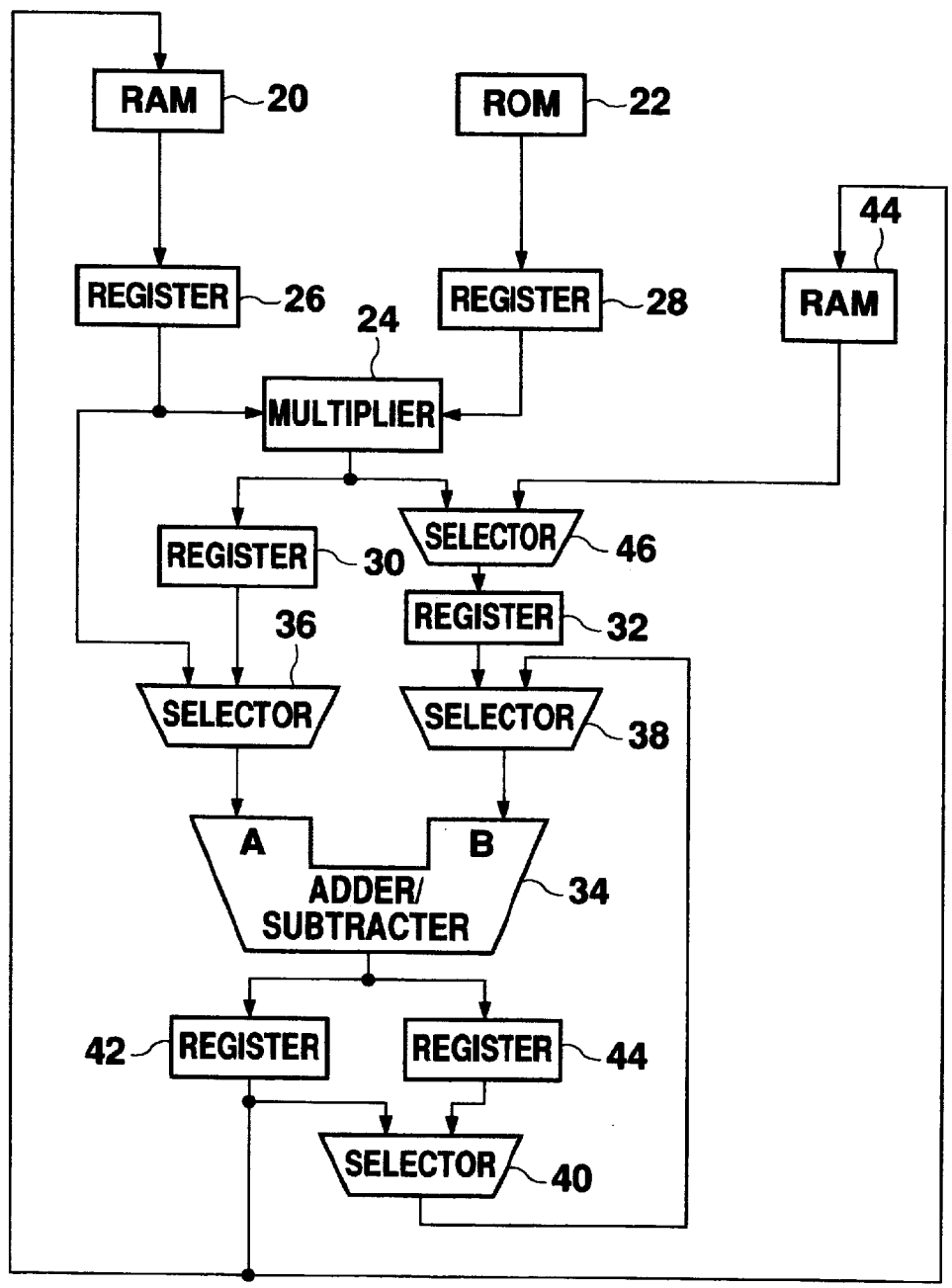
FIG. 2 is a schematic block diagram showing a structure of a conventional IMDCT circuit.
Figure 3:
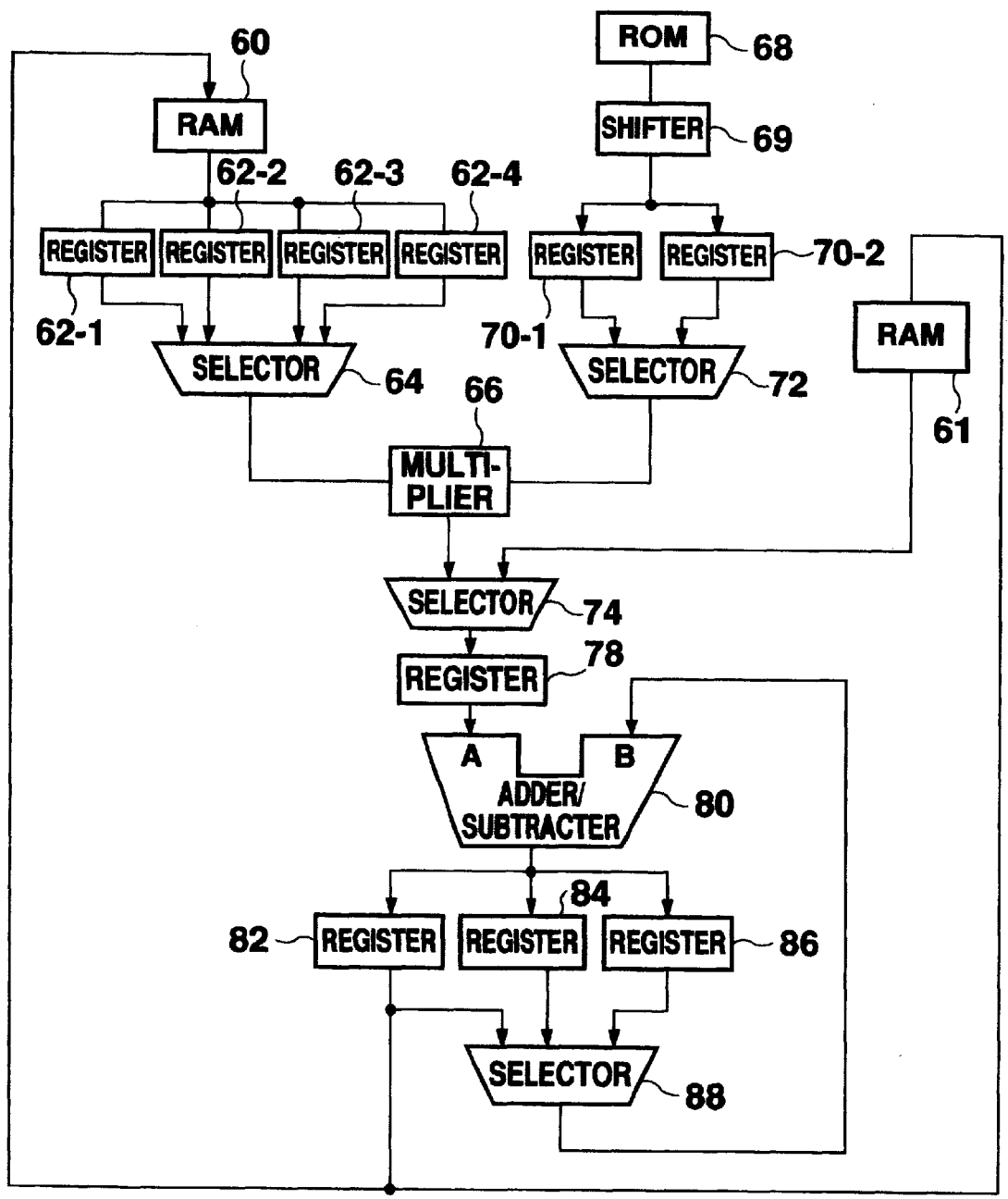
FIG. 3 is a schematic block diagram showing a MDCT/IMDCT bi-directional conversion circuit incorporating the present invention in an audio recording/reproducing device, such as an MD system.

FIG. 3 is a block diagram of an IMDCT circuit in which the present invention is applied in an MD system or voice recording/reproducing device using MDCT. The voice recording/reproducing device of the embodiment includes a voice data encoding/decoding section having the same block structure as shown in FIG. 1. This circuit is adapted to encode processing, which is conventionally carried out by the DCT circuit 6 in FIG. 1, for generating frequency component data from digital audio data, and to decode processing, which is conventionally carried out by the IDCT circuit 12, for reproducing audio from digital data recorded in an MD. When the circuit is used as a DCT circuit, digital time series audio data y(n) in high, intermediate, low frequency bandwidths, inputted from the QMF circuit 4, is DCT-processed to generate frequency component data X(k) for each of the three frequency bandwidths to transmit the resultant data X(k) to the quantizer 8. When the circuit is used as an IDCT circuit, on the other hand, the frequency component data X(k) for each of high, medium and low frequency bandwidth transmitted from the inverse quantizing unit 10 are IMDCT-processed to generate the time series voice data y(n) for each of the three frequency bandwidths and transmit the data to IQMF circuit 14.

Since the basic arithmetic operation algorithm of IMDCT performed by the circuit is the same as the related-art algorithm described above, the description is simplified by referring to the related art.

In this circuit, for IMDCT, data before conversion, i.e., frequency component data X(k), is stored in the RAM 60, and converted to generate time series audio data y(n), which is stored in the RAM 61. For MDCT, on the other hand, data before conversion, i.e., time series audio data y(n), is stored in the RAM 61, and converted to generate a frequency component data X(k), which is then stored in the RAM 60.

The RAM 60 and 61 may be used to store, if necessary, a result during the course of arithmetic operation. Here, the RAM 60, 61 may be structured using a single RAM. That is, a single RAM is divided by means of address division so that the RAM operates in a pseud manner as two RAMs 60 and 61. With this arrangement, data stored in either the RAM 60 or 61 can be seemingly moved to the other, i.e., without actual data movement, when read addresses are exchanged.

Four registers 62-1 to 62-4 are arranged in parallel with the output of RAM 60, in which the data read from RAM 60 can be held. A selector 64 selects any one of the registers 62-1 to 62-4, and transmits the content of the selected register to a multiplier 66.

The proportional coefficient by which the data read from RAM 60 is multiplied, e.g., $a_L$ (L=0 to 3) is stored in ROM 68.

A shifter 69 shifts, if necessary, a proportional coefficient read from the ROM 68 by a predetermined number of bits. For example, for the data number $M=2^\mu$, a proportional coefficient $a_L$ is shifted by $(\mu-1)$ bits in the LSB (least significant bit) direction. When a proportional coefficient $a_L$ read from the ROM 68 is thus shifted, a proportional coefficient $b_L$ for use in MDCT can be generated, based on the relationship of equation (12). This makes it possible to apply the same generation process to generate access addresses to the ROM 68 for use in the processes for equation (5) for IMDCT and for equation (11) for MDCT. Alternatively, a proportional coefficient $b_L$ (L=0~3) may be stored in the ROM 68, and read therefrom to be shifted in the opposite direction from the above by the shifter 69 to thereby generate a proportional coefficient $a_L$.

Two registers 70-1, 70-2 eachstoring a proportional coefficient supplied by the shifter 69 are provided in parallel on the output side of the shifter 69. Similar to the selector 64, the selector 72 selects any one of the registers 70-1 and 70-2, and transmits the content of the selected register. The selector 72 can additionally output the value "1". That is, the selector 72 selects any one of the contents of the registers 70-1 and 70-2 and the value "1" under control from the outside, and outputs the selected signal to the multiplier 66. The meaning of the value "1" is described below.

The multiplier 66 receives outputs from the selector 64 on the RAM 60 side and the selector 72 on the ROM 68 side, and multiplies them to output the result.

A selector 74 selects the multiplication result transmitted from the multiplier 66 or the value read from RAM 61 to store the selected value in a register 78.

An adder/subtracter 80 has two input terminals A, B to add/subtract values transmitted to the terminals. The output of the register 78 is connected to one input terminal, e.g., the input terminal A. The output side of the adder/subtracter 80 is connected to three registers 82, 84, 86. The other input terminal B of the adder/subtracter 80 is connected to the output of a selector 88, whose input side is connected to the registers 82, 84, 86.

The selector 88 has a general function of selecting any one of the three connected registers 82, 84, 86 to output the content of the selected register, and is also provided with value "0" as an output to be selected in addition to the contents held in the registers. Specifically, the selector 88 selects any one of the four outputs, i.e., the contents held in the registers 82, 84, 86 and the value "0", under the control from the outside to transmit the selected output to the input terminal B of the adder/subtracter 80. The meaning of the value "0" is described below.

The output of the adder/subtracter 80 can be stored in RAM 60 and RAM 61 via the register 82. In the structure, for example, the data in the course of the arithmetic operation can be accumulated in RAM 60, or the voice data y(n) can be stored in RAM 61 when the voice data is obtained from the frequency component data X(k) for one block in IMDCT processing.

An output from the RAM 61 is supplied through the selector 74 to the adder/subtracter 80 via the input terminal A thereof, whereby time series audio data y(n) stored in the RAM 61 can be supplied intact to the adder/subtracter 80. The route from the RAM 61 to the input terminal A of the adder/subtracter 80 is used in two processes: in calculation of relational equation (7) using data before MDCT conversion, i.e., time series audio data y(n), stored in the RAM 61, and in a final stage for IMDCT processing. In IMDCT, in order to minimize the distortion of voice at boundaries of the blocks, the range of the block is determined in such a manner that the end of the preceding block and the top of the block are overlapped with each other. In the overlapped area, the data values of these blocks are added to generate the final voice data y(n). The above route is used to return the audio data stored in the RAM 61 back to the adder/subtracter 80 to achieve data overlapping.

The selector 72 is constituted to output the value "1". In the structure, the input system to the adder/subtracter is unified for both cases where the data read from RAM 60 and multiplied by the proportional coefficient is transmitted to the adder/subtracter 80 and cases where the value of the data is transmitted to the adder/subtracter 80 as it is without multiplying the data by the proportional coefficient, and the selector which has been needed for switching is eliminated to thus simplify the circuit structure. Specifically, the data read from RAM 60 is passed through the multiplier 66. On the other hand, when the value read from RAM 60 needs to be transmitted to the adder/subtracter 80 as it is, "1" is outputted from the selector 72. In this case, the output value of the multiplier 66 is made equal to its input value. Therefore, the need for the selector 36 required in conventional circuits, can be eliminated.

The selector 88 is constituted to output "0". The reason for this structure is related to the structure in which the output of the multiplier 66 is transmitted only to one input terminal A of the adder/subtracter 80 and only the loopback from the output of the adder/subtracter 80 is connected to the other input terminal B. By the structure of the circuit in which no data is transmitted to the input terminal B from the multiplier 66, the selector, which has been necessary for the switching to the loopback from the output of the adder/subtracter 80, is disused to simplify the circuit structure. In the structure, in order to add/subtract the calculated values transmitted to the input terminals of the adder/subtracter 80, the value transmitted to the input terminal A is passed by the adder/subtracter 80 and directed to the input terminal B. Specifically, in order to allow the value transmitted to the input terminal A to pass by, the value "0" is transmitted to the input terminal B of the adder/subtracter 80 from the selector 88. For example, the adder/subtracter 80 adds the data of the input terminal A and the data "0" of the input terminal B, and stores the added result to any one of the registers 82, 84, 86. Thereby, the calculated data transmitted to the input terminal A is passed toward the output side of the adder/subtracter 80, and the value is returned to the input terminal B of the adder/subtracter 80 via the selector 88. The value can therefore be used in the adding/subtracting with the calculated data transmitted to the input terminal A.

Next, calculations of the aforementioned relational equations for MDCT and IMDCT in the circuit according to this embodiment will be described.

Relational equation (2) and (8) will be calculated as follows. Although only relational equation (2) for IMDCT will be described in the following, relational equation (8) for MDCT may be similarly calculated as these equations have corresponding formats.

Relational equation (2) is calculated by first calculating relational equation (13), which is equivalent to relational equation (2). That is, data before conversion, or frequency component data X(k), is rearranged to define u(k), and Z(j) is calculated based on U(k) using relational equation (13). The above is common to the related art in that data U(k) is stored in the RAM 60 and sin $\psi(j)$ and cos $\psi(j)$ are stored in the ROM 68. Specifically, when calculating the right side member of relational equation (13) for certain "j", U(2j) and U(2j+1) are read from the RAM 60, and stored in two different registers among the registers 62-1 to 62-4, for example, registers 62-1 and 62-2, and cos $\psi(j)$ and sin $\psi(j)$ are read from the ROM 68, and respectively stored in the registers 70-1 and 70-2. Then, real-number and imaginary-number portions of Z(j) are calculated separately in the multiplier 66 and the adder/subtracter 80.

For example, for a real-number portion, the multiplier 66 multiplies U(2j+1) read from the register 62-2 and sin $\psi(j)$ read from the register 70-2 to obtain a value for the second term of the right side member of relational equation (13) to input the input terminal A of the adder/subtracter 80. The value for the second term is passed intact through the adder/subtracter 80, and stored in, for example, the register 86. Then, a value for the first term of the right side member of relational equation (13) is obtained by the multiplier 66 multiplying U(2j) read from the register 62-1 by cos $\psi(j)$ read from the register 70-1. The value for the first term is supplied to the adder/subtracter 80 via the terminal A, while the value for the second term is read from the register 86 and supplied to the adder/subtracter 80 via the terminal B. Using the supplied values, the adder/subtracter 80 does subtraction, i.e., A−B, to thereby calculate the real-number portions of Z(j). The calculation result is outputted through the register 82 to the RAM 60 to be stored therein.

Note that calculation of relational equation (8) will be made similar to the above, using the calculation result of preceding relational equation (7), or X'(n), which is stored in the RAM 60.

Next, relational equation (3) and (9) will be calculated as follows. Although relational equation (3) for IMDCT will only be described in the following, relational equation (9) for MDCT will be similarly calculated as they have identical format.

Relational equation (3) is a calculation for obtaining z(n) using Z(k). In this calculation, arithmetic operation in the form of equation (4) is repeated. The arithmetic operation for each equation (4) is made as follows. Z(j) was obtained in the above operation and has been stored in the RAM 60. A phase factor exp(i$\psi$'(j)) is pre-stored in the ROM 68. Z($j_1$) and Z($j_2$) are read from the RAM 60 and respectively stored in, for example, the registers 62-1, 62-2. On the other hand, exp(i$\psi$'(j)) is read from the ROM 68 and stored in the register 70-1. By using the values read from the registers 62-2 and 70-1, a value for the second term of relational equation (4) is calculated. The resultant value is passed intact through the adder/subtracter 80, and supplied back to the adder/subtracter 80 via the input terminal B thereof. On the other hand, the value for the first term, which has been moved to the register 62-1, is passed intact through the multiplier 66, and supplied to the adder/subtracter 80 via the terminal A. Using these values, the adder/subtracter 80 adds or subtracts to complete arithmetic operation for each relational equation (4). The resultant value is loaded to the RAM 60. Note that the above calculation for z(n) is a complex arithmetic operation, in which real-member and imaginary-number portions are calculated separately.

On the other hand, z(n), which is used in the arithmetic operation for relational equation (9), was calculated as a result of relational equation (8) and has been stored in the RAM 60. Equation (9) is calculated by using z(n) in a similar arithmetic operation as that for equation (3).

Next, relational equations (5) and (11) are calculated. Relational equation (5) for IMDCT is first described. The arithmetic operation for relational equation (5) is to obtain u(n) using z(n).

The value z(n) is stored in RAM 60 by the arithmetic operation described above. Additionally, the proportional coefficient $a_L$ (L=0 to 3) is pre-stored in ROM 68. In the calculation of the equation (5) regarding n=$n_1$, Rez($n_1$), Rez(M/2−1−$n_1$), Imz($n_1$), Imz(M/2−1−$n_1$) are read from RAM 60, and stored, for example, in the registers 62-1, 62-2, 62-3, 62-4, respectively. On the other hand, $a_2$, $a_3$ corresponding to n=$n_1$ are read from ROM 68, and stored in the registers 70-1, 70-2, respectively. The multiplication of the fourth term on the right side of the first equation of the equation (5) is performed using the values of the registers 62-4, 70-2. The result value is passed through the adder/subtracter 80, and supplied to the input terminal B of the adder/subtracter 80. On the other hand, the third term of the right side of the equation is calculated in the multiplier 66 using the values of the registers 62-3, 70-1, and supplied to the input terminal A of the adder/subtracter 80. The adder/subtracter 80 adds these values, and stores the added value, for example, in the register 86 connected to the output of the adder/subtracter 80. Subsequently, $a_0$, $a_1$ are read corresponding to n=$n_1$ from ROM 68, and stored in the registers 70-1, 70-2, respectively. The multiplication of the second term of the right side is performed using the values of the registers 62-2, 70-2. The value of the multiplication result and the value held in the register 86 are transferred to the input terminals A, B of the adder/subtracter 80, respectively. The addition result from the adder/subtracter 80 is stored in the register 86. In the same manner, the value of the first term of the right side obtained using the values of the registers 62-1, 70-1 and the addition result of the second to fourth terms held in the register 86 are transferred to the input terminals A, B of the adder/subtracter 80, respectively, and added in the adder/subtracter 80. Thereby, the arithmetic operation of the first equation of the equation (5) is completed, and the arithmetic operation result is stored in RAM 60 via the register 82.

On the other hand, Z(k), which is used for the calculation for equation (11), was calculated as a result of equation (9) and has been stored in the RAM 60. By reading Z(k), the same arithmetic operation as that for equation (5) is performed. Here, note that a proportional coefficient $b_L$ is used in the place of the proportional coefficient $a_L$, which is used for relational equation (5). Proportional coefficients $a_L$ and $b_L$ have a relationship as expressed by relational equation (12). In calculation of relational equation (11), the shifter 69 shifts proportional coefficient $a_L$ read from the ROM 68 by a predetermined number of bits to output a proportional coefficient $b_L$. The use of proportional coefficient $b_L$, instead of $a_L$, is the only significant difference between relational equations (11) and (5); the other procedures are the same. In particular, proportional coefficient $a_L$ for use to calculate u(j) in equation (5) for certain j and proportional coefficient $a_L$ for use to generate proportional coefficient calculate $b_L$ for use to calculate X(j) in equation (11) for the same j are both proportional coefficient $a_L$(j). That is, read addresses from ROM 68 for IMDCT and MDCT can be generated in the same procedure. Thus, both processes can be switched with a simple circuitry control of the shifter 69.

Here, IMDCT conversions can be performed by using relational equations (2), (3), and (5) described above. On the other hand, MDCT requires additional calculation of relational equation (7), in addition to calculations of relational equations (8), (9), and (11). Relational equation (7) is calculated as follows. That is, time series audio data x(n) for use in the calculation is multiplied by a window function, and outputted from the QMF circuit 4 to the RAM 61 to be stored therein. Initially, x($n_2$) is read from RAM 61 and supplied to the adder/subtracter 80 via the input A. In this circuit, the selector 88 outputs a value "0" to the input terminal B. The adder/subtracter 80 does addition/subtraction using the supplied value "0" and x($n_2$), so that x($n_2$) is passed through the adder/subtracter 80 without changing the value thereof and held, for example, in the register 86. Subsequently, x($n_1$) is read from the RAM 61 and supplied to the adder/subtracter 80 via the input terminal A. Simultaneously, x($n_2$), held in the register 86, is supplied to the adder/subtracter 80 via the input terminal B. The adder/subtracter 80 then does addition, "A+B", or subtraction, "A−B", to thereby calculate relational equation (7). Note that if x($n_2$) is not multiplied by a window function, it may be multiplied by a window function in the multiplier 66 and the multiplication result is supplied to the adder/subtracter 80. This can be easily realized by exchanging reading addresses from the RAMs 60 and 61 so that x($n_2$), actually stored in the RAM 61, is seemingly moved to the RAM 60 and read from the RAM 60 to be supplied through the multiplier 66 to the adder/subtracter 80. The registers 86 and the selector 88 operate totally the same in the above when x($n_2$) is read from the RAM 61.

It should be noted, in IMDCT, final digital time series audio data y(n) is obtained through recomposition of the sequence u(n) having been obtained as above. Then,the time series audio data y(n) obtained through the recomposition is supplied to the D/A converter 16 to complete a series of processing. In MDCT, on the other hand, X(k) is supplied to the quantizer 8 for completion of the processing.

As described above, the arithmetic operation for discrete cosine transformation from time series audio data to frequency component data includes addition or subtraction using values without multiplication by a proportional coefficient, which must be performed before the arithmetic operation similar to the inverted transformation from frequency component data to time series audio data. According to the discrete cosine transformation circuit of the present invention, the structure of a circuit for discrete cosine inverted transformation can be simplified, and the above addition and subtraction using non-multiplied data of the above time series audio data can be achieved. As bi-directional transformation can be achieved by a single circuit, the structure of a discrete cosine transformation circuit can be simplified and the size thereof can be reduced.

What is claimed is:

1. A discrete cosine transformation circuit for use in a digital audio recording/reproducing device, for carrying out discrete cosine transformation from time series audio data to frequency component data and inverted discrete cosine transformation from frequency component data to time series audio data, comprising:

a first memory for storing the frequency component data which is data before conversion at beginning of reproduction;

a coefficient supplier for supplying a proportional coefficient for multiplication with the data read from the first memory;

a multiplier connected to the first memory and the coefficient supplier;

an adder/subtracter having first input terminal and second input terminal, connected to an output of the multiplier;

a second memory connected on the output side to the first input terminal of the adder/subtracter, for storing the time series audio data which is data before conversion at beginning of recording;

an addition-subtraction result register for storing an output from the adder/subtracter; and an addition-subtraction result selector connected on the output side to the second input terminal of the adder/subtracter, for outputting either contents of the addition-subtraction result register or a value "0", the frequency component data being transformed to the time series audio data for reproduction, the addition-subtraction result selector outputting the value "0" when data read from the second memory is supplied intact to the second input terminal of the adder/subtracter so that an output from the multiplier is stored intact in the addition-subtraction result register, the time series audio data being transformed to the frequency component data for recording.

2. A discrete cosine transformation circuit according to claim 1, wherein the coefficient supplier includes a proportional coefficient memory for storing the proportional coefficient for application in either one of the discrete cosine transformation and the inverted discrete cosine transformation, and a bit shifter for multiplying, when carrying out a transformation other than the one above, the proportional coefficient read from the proportional coefficient memory by two raised to a predetermined power to output to the multiplier.

3. A discrete cosine transformation circuit according to claim 1, wherein the first memory and the second memory are two different address regions in a common memory device.

4. A discrete cosine transformation circuit according to claim 2, wherein the first memory and the second memory are two different address regions in a common memory device.

* * * * *

UNITED STATES PATENT AND TRADEMARK OFFICE
CERTIFICATE OF CORRECTION

PATENT NO. : 6,292,817 B1
DATED : September 18, 2001
INVENTOR(S) : Masaru Matsui It is certified that error appears in the above-identified patent and that said Letters Patent is hereby corrected as shown below:

Column 2,
Line 60, after "equation" delete "$Z(k) = \Sigma \approx(j)\exp(I \ \psi'(j))$" and insert therefor
-- $Z(k) = \underset{j}{\Sigma} z(j) \exp(i \ \psi'(j))$ --

Column 4,
Line 32, after "coefficient" delete "aL" and insert therefor -- $a_L$ --
Line 47, after "and" delete "a," and insert therefor -- $a_1$ --

Column 5,
Line 3, before "However" delete "INDT." and insert therefor -- IMDT. --

Signed and Sealed this

Fifth Day of April, 2005

JON W. DUDAS
*Director of the United States Patent and Trademark Office*